H. REINHARD.
MANUFACTURE OF METAL TUBES AND THE LIKE.
APPLICATION FILED JULY 31, 1908.

908,329.

Patented Dec. 29, 1908.

Attest:
Ewd L. Folson.
H. M. Barrett.

Inventor:
Henry Reinhard,
by Shean Middleton Donaldson Shean
Atty's.

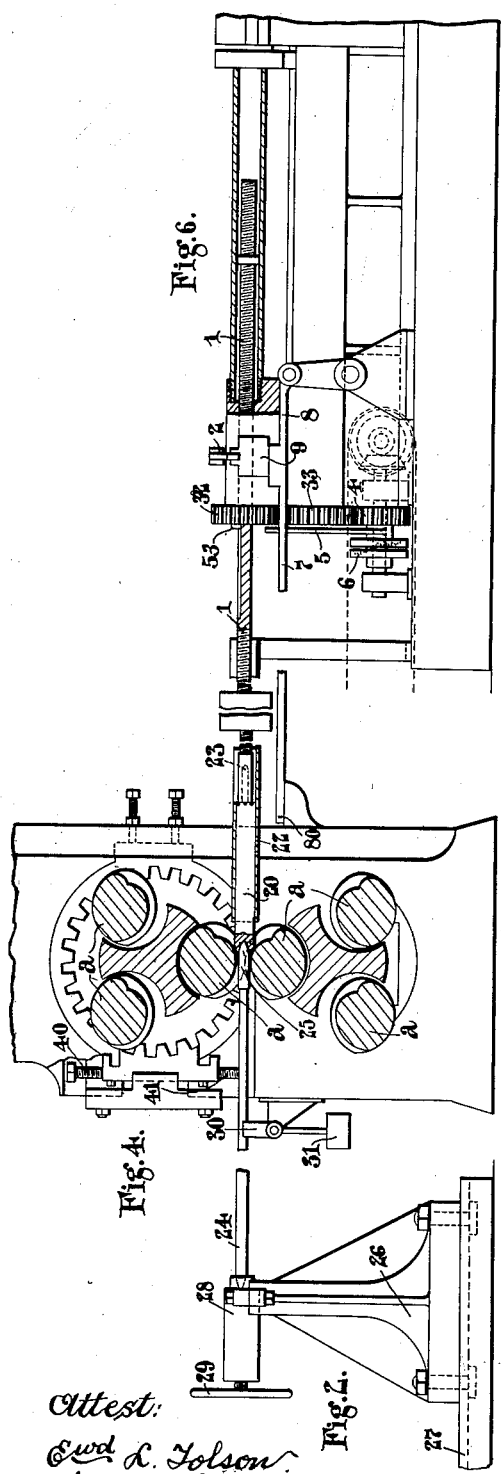

H. REINHARD.
MANUFACTURE OF METAL TUBES AND THE LIKE.
APPLICATION FILED JULY 31, 1908.

908,329.

Patented Dec. 29, 1908.
5 SHEETS—SHEET 3.

Attest
Bent. M. Stahl.
Edward N. Saxton.

Inventor
Henry Reinhard
by Spear, Middleton, Donaldson & Spear
Attys.

H. REINHARD.
MANUFACTURE OF METAL TUBES AND THE LIKE.
APPLICATION FILED JULY 31, 1908.

908,329.

Patented Dec. 29, 1908.
5 SHEETS—SHEET 4.

Attest
Bent. M. Stahl.
Edward N. Sarton.

Inventor
Henry Reinhard
By Spear, Middleton, Donaldson & Spear
Attys.

H. REINHARD.
MANUFACTURE OF METAL TUBES AND THE LIKE.
APPLICATION FILED JULY 31, 1908.

908,329.

Patented Dec. 29, 1908.
5 SHEETS—SHEET 5.

Attest
Bent. M. Stahl.
Edward N. Sarton.

Inventor
Henry Reinhard
By Spear, Middleton, Donaldson & Spear,
Attys.

UNITED STATES PATENT OFFICE.

HENRY REINHARD, OF BIRMINGHAM, ENGLAND, ASSIGNOR TO TUBES LIMITED, OF BIRMINGHAM, ENGLAND.

MANUFACTURE OF METAL TUBES AND THE LIKE.

No. 908,329.      Specification of Letters Patent.      Patented Dec. 29, 1908.

Application filed July 31, 1908. Serial No. 446,341.

*To all whom it may concern:*

Be it known that I, HENRY REINHARD, a subject of the King of Great Britain and Ireland, and residing at Catherine street, Aston, Birmingham, in the county of Warwick, England, have invented certain new and useful Improvements Relating to the Manufacture of Metal Tubes and the Like, of which the following is a specification.

This invention relates to metal rolling processes in which a mass of metal has to be pierced for the reception of a mandrel or like device, as in tube manufacture, or to the piercing of a solid metal bar into a finished tube when thick walled tubes are required. Several methods have, up to the present, been proposed and used for effecting such piercing, but each has inherent disadvantages.

The object of this invention is to effect piercing in an improved manner.

The invention consists in piercing a mass of metal to form a tube or the like by feeding it by suitable means against a mandrel or the like the bloom travel being uni-directional or intermittently forward and not a reciprocating travel while it is simultaneously being acted on by rolls, such as pilger rolls carried in rotating housings and operating in sequence on the bloom longitudinally.

The invention also consists in the method of and apparatus for piercing hereinafter described.

Figure 1:
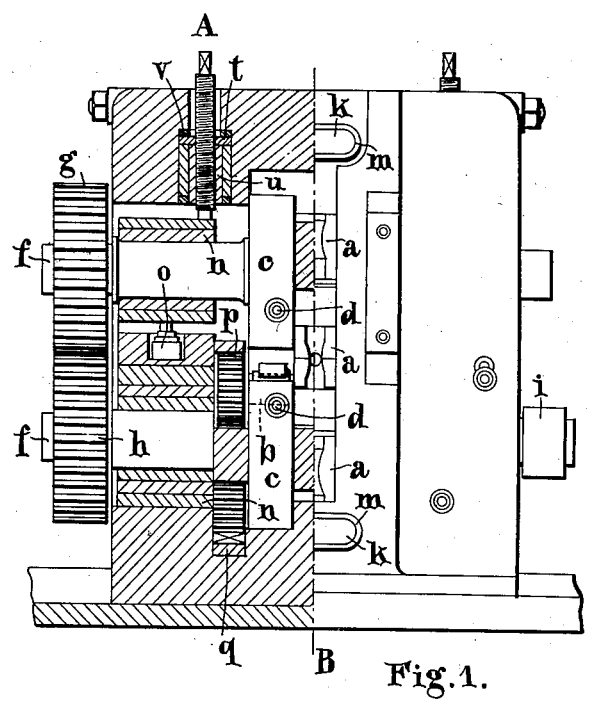
Figure 8:
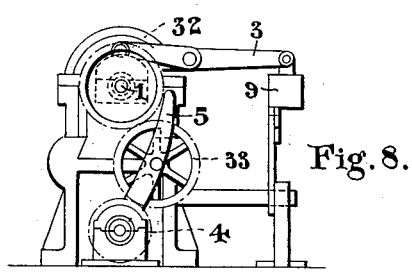
Figure 9:
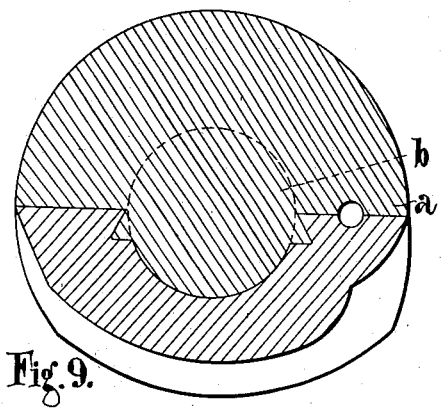
Figure 13:
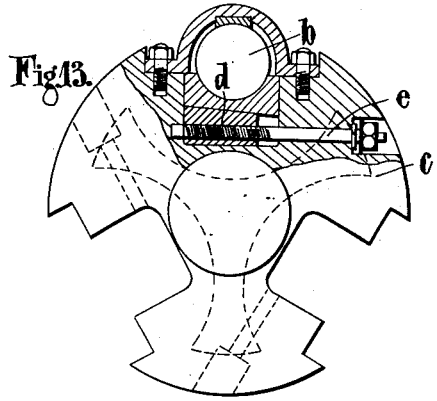
Figure 10:
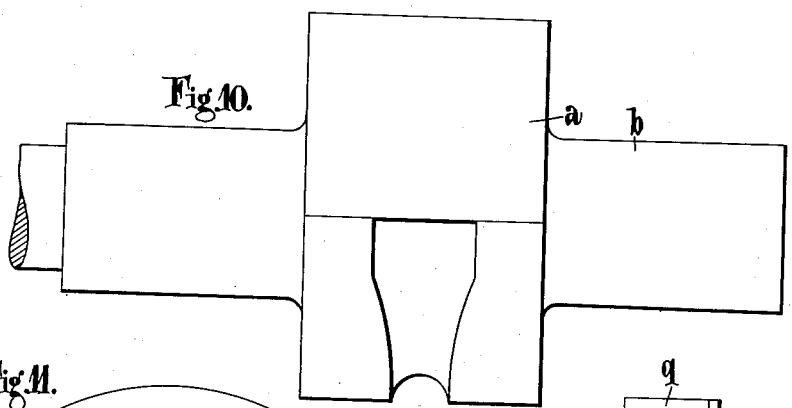
Figure 11:
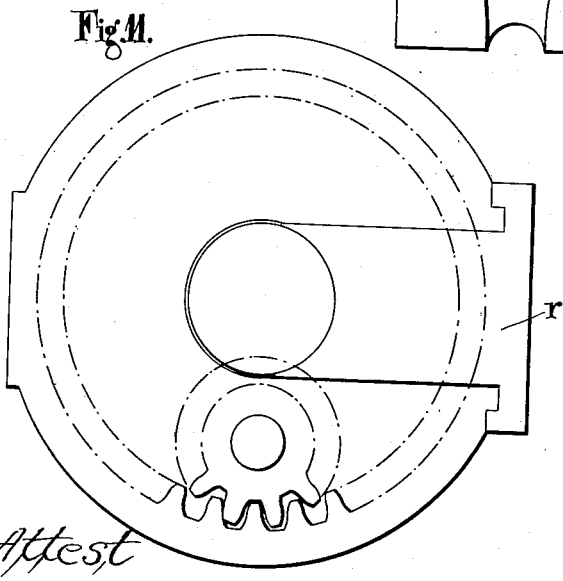
Figure 12:
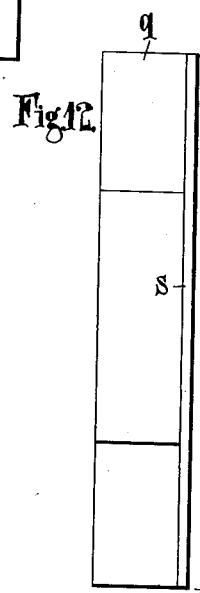
Figure 17:
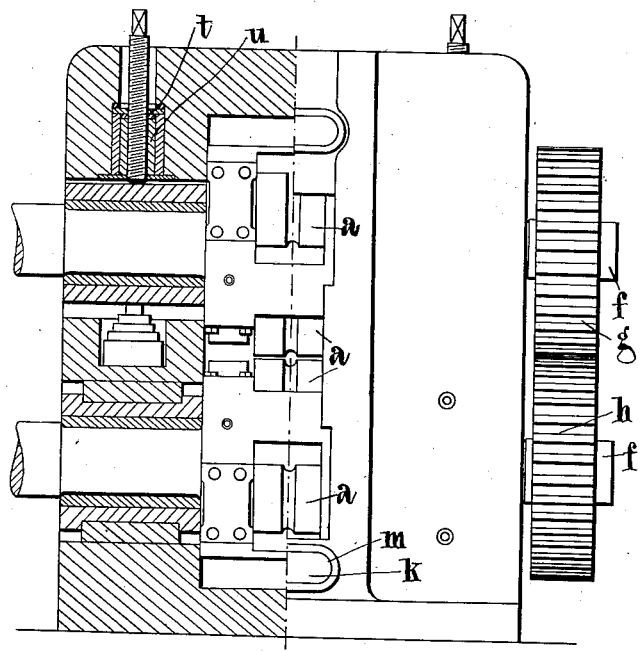
Figure 44:
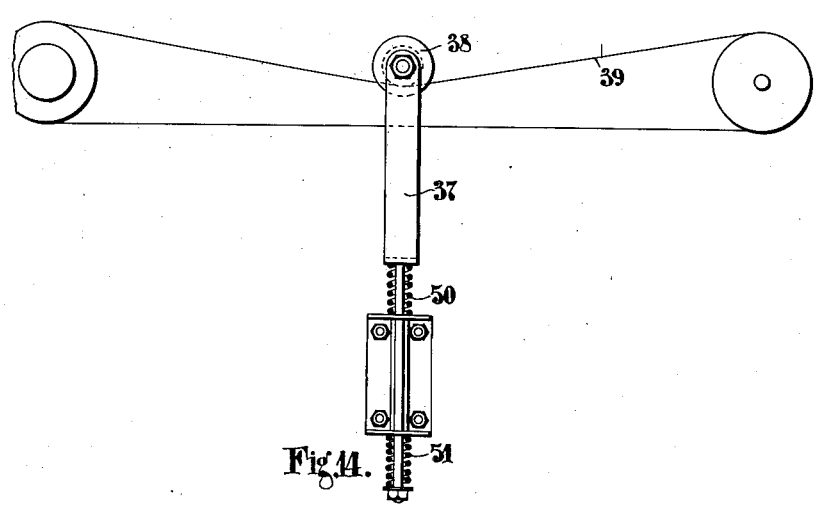
Figure 45:
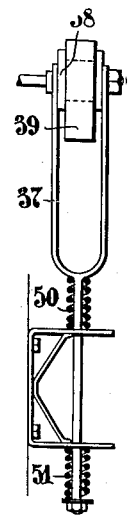
Figure 16:
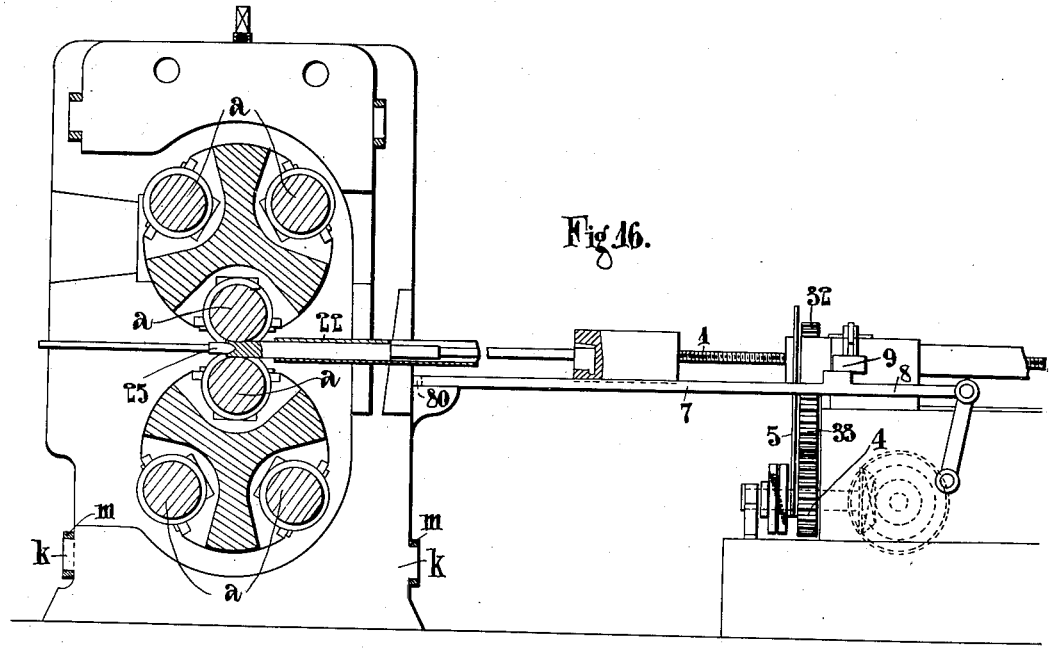
Figure 18:
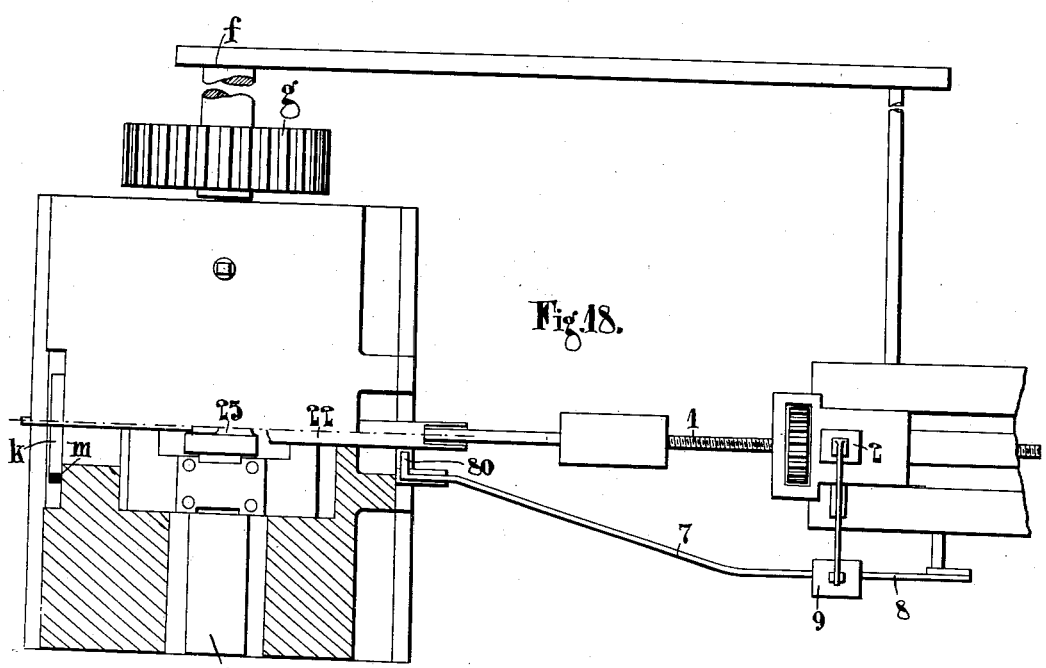

Referring to the accompanying drawings, Figure 1 is a front elevation partly in section of the mill part of one form of the apparatus; Fig. 2 is an elevation of an adjustable element for controlling the piercing; Fig. 3 is a plan view of Fig. 2; Figs. 4 and 5 are a side elevation and plan respectively of the pilger part of the apparatus; Figs. 6 and 7 show in elevation and plan respectively the feeding arrangement; Fig. 8 represents an end view corresponding to Fig. 6; Figs. 9 and 10 are a section and side view respectively of a roll; Figs. 11 and 12 show an elevation and end view of the divided toothed ring; Fig. 13 represents an arrangement of the roll carriers. Figs. 14 and 15 represent a form of belt tightening and loosening device. Figs. 16–18 show in part sectional elevation, front elevation, and plan respectively a form of piercing mill with continuous grooved rolls.

In carrying the invention into effect in the form illustrated in Figs. 1–13, three pairs of pilger rolls, $a$, are mounted on journals, $b$, in housings, $c$, journals of each roll being mounted in each housing.

The rolls are preferably constructed as shown in Figs. 9 and 10, that is to say, in segments, so that the working part of the roll may be easily removed from the machine without affecting the other part. The rolls are grooved as is usual with pilger rolls except that they need have no gap in view of the method of operation of this mill. The position of each roll axle is adjustable by means of wedge pieces, $d$, operated by screw means, $e$, in order that their relation to the bloom under compression may be varied if desired to counteract the effects of unequal wear of the rolls which may arise from various causes, and which in itself would produce bulgy tubes.

The roll housings, $c$, are mounted on main shafts, $f$, having suitable bearings in the frame-work of the machine, and are adapted to rotate in opposite directions, for example, due to gear wheels, $g$, $h$; and pulley, $i$ serves to operate the intermittent feed.

It is found convenient to construct the housing in two parts and form projections, $k$, thereon, which are adapted to be held together by shrunk rings, $m$. The main axles, $f$, are also adjustable by screw operated pieces, so that the sets of rolls may be brought nearer together or may be relatively separated, and springs, $o$, are provided to permit a certain amount of elasticity of movement when the adjusting screws are operated.

On the roll axles, $b$, are mounted gear wheels, $p$, adapted to mesh with an internally toothed ring. This ring is constructed in two parts, $q$ and $r$, in order that the part, $r$, may be removed and so allow the rolls to be easily taken out without dismantling the main axles and the axles can be taken out without dismantling the whole of the structure.

In the form illustrated the ring has a plate, $s$, attached to one side. Such a plate $s$ may be attached to both sides of the ring or the ring may be used without any plates.

In the form illustrated one ring is arranged on each side of the machine in order to equalize the effects. The rings are substantially fixed in position during operation, that is to say, so as to allow the gear wheels, $p$, to act as planet pinions and cause rotation of the rolls themselves as the main axles rotate, but they are permitted vertical travel in order to avoid unnecessary stresses.

In the form illustrated straps are fixed to the housing for guidance of these rings and the allowable travel adjusted by screw members 40 and 41. Only a slight travel is necessary and this is found to prevent any tendency to rotate of the upper toothed ring and thus insure corresponding parts of the rolls coming into operation simultaneously. It is not essential that this arrangement shall be applied only in the upper part of the mill. Should abnormal stresses however occur and be transmitted to the main axle, they would in the form illustrated result in the shearing of a steel washer, $t$, which forms a breakable connection between the elements supported by the housing and the nut of the adjusting screw placed between shearing members, $u$ and $v$, whereby the stress will be relieved before the rolls are damaged.

The bloom, 20, to be pierced is placed in the trough, 21, of a guide piece, 22, situate just behind the pilger rolls and fixed in any suitable manner, for example, to the housings of the mill. Behind this guide there is placed a head, 23, recessed internally and of such a size that it can enter and pass through the guide 22 in order that the bloom may be pierced throughout its entire length. On the front end of the head, 23, projections are formed for causing the bloom to be turned whenever the head is rotated. Feeding of the bloom is accomplished by means of a screwed rod attached to the head, 23, suitably mounted and on which a segment of a nut, 2, can be placed or removed by means of the lever, 3. The rod, 1, is rotated by means of the wheels, 32, 33 and 4, which may be driven from the main axles through suitable gearing, acting in conjunction with a key, 53, sunk in a longitudinal groove in the rod, 1. The wheels are adapted to be brought into operation or taken out of operation in the form illustrated by means of a hand lever, 5, in order to control rotation if desired.

The feeding forward of the screwed spindle is effected when the segmental nut, 2, is in position. As the metal can only be fed when it is not being acted on by the rolls, and as it is preferable that the feeding arrangement should be continuously driven a spring coupling, 6, is introduced which takes up the feed by storing energy in the spring while the metal is under compression and dissipating it immediately the rolls leave the bloom. In place of this arrangement belt tightening and loosening arrangements may be employed.

In the form illustrated in Figs. 14 and 15 the arrangement consists of a large fork, 37, to the top end of which is attached a roller, 38. This roller is placed over the top of the belt, 39, and is arranged so that the belt is slacked to about the position shown; at the bottom end of the fork are arranged springs, 50 and 51, which tend to hold the fork in the position shown. One of the pulleys is fastened on the main shaft of the mill, the other to the shaft which by means of suitable gearing rotates the feeding spindle, 1. If the feeding spindle is now held still, as when the metal is under compression in the rolls, this pulley is held still, but as the pulley on the main shaft is continuously turning the belt, 39, is tightened on the top side, and so the fork is drawn up this tightening the bottom spring, 51. When the feeding spindle again rotates, this spring, 51, expands and acting in addition to the weight of the fork, so pulls the fork down to its normal position, the top spring acting as a buffer. In this way the continuous drive gives an intermittent feed as required.

In order to stop feeding when the billet has reached the end of its travel in one form a longitudinal rod, 7, (see Figs. 16-18) is provided having a sunk or shouldered portion, 8, and also a stop, 80, adapted to be caught by a member such as the feeder head, moving in harmony with the billet at the end of the operation. This causes the rod, 7, to be moved forward and to allow the weight, 9, to drop into the part, 8, and so through the lever, 3, raise the nut off the screwed spindle.

The mandrel, 24, with which the bloom is to be pierced has an enlarged piercing head, 25, of length substantially equal to the working length of the rolls. It is brought into position by means of a stop, 26, mounted on rails, 27, and having a head, 28, which can swing sidewise on a pivot 28$^a$ arranged so that the proper position may be readily obtained by a hand wheel, 29. A mandrel guide which may consist in a forked part, 30, pivoted to the framework of the mill having a counterweight, 31, may also be provided, if desired.

On the hot billet being placed in the trough, 21, and moved into position the piercing head, 25, also being in position, the feeding may be started by lowering the nut, 2. As the billet is pushed against the head, 25, it is expanded the rolls taking the expanded portion and forcing it over the piercing head. After one set of rolls has passed, the feed again advances the billet when the same operation takes place and so on until the whole of the billet is pierced; the provision of the recessed part of the feed head, 23, being for the purpose of allowing this to pass over the piercing mandrel, 25, so that the latter may enter the recess. After the operation, the head, 28, is turned round sidewise and the pierced billet removed on its mandrel.

Various modifications may be made in the details of the mill described without departing from the spirit of the invention.

The rolls may be shaped according to the size, shape, or thickness it is desired to obtain in the pierced bloom, and any suitable number of pilger rolls may be used. Further in place of pilger rolls other rolls may be employed such as rolls with concentric grooving, so long as they are mounted so as to forge the metal over the mandrel after it has been fed thereto with a compressing action as in the mill referred to above. With regard to concentrically grooved rolls it is a property of such that as, obviously they may grip the metal at any part of the groove, it is unnecessary to use an internally toothed ring or like means to bring them into any definite gripping position.

A piercing arrangement with concentrically grooved rolls is shown in Figs. 16–18 which is similar to the first described form in other respects.

By means of the arrangements described above the speed may be greatly increased above that of any of the other piercing processes.

The metal pierced by this method is much sounder than that manufactured by any of the rotating systems, as the metal cannot be damaged, but is gradually and yet quickly forged over the mandrel, as explained above.

Having now described my invention what I claim as new and desire to secure by Letters Patent is:—

1. The method of piercing a solid mass of metal in order to form a longitudinally apertured article which consists in feeding a blank in one direction towards and against a mandrel sufficiently to cause a piercing action to take place, and then subjecting it to reducing pressure operating longitudinally upon the outer portion of the part of the blank subjected to the piercing action, the point of application of the pressure progressively traveling relative to the mandrel in the direction of feed of the blank and at a rate of speed relative to the mandrel equal to the rate of elongation of the blank due to the pressure and at the time the same is taking place.

2. The method of piercing a solid mass of metal in order to form a longitudinally apertured article which consists in feeding the blank in one direction towards and against a mandrel sufficiently to cause a piercing action to take place, said mandrel having a piercing head and a body portion adjacent thereto, and then subjecting the blank to reducing pressure operating longitudinally upon the blank and adjacent to the body portion of the mandrel, the point of application of the pressure progressively traveling relative to the mandrel in the direction of feed of the blank and at a rate of speed relative to the mandrel equal to the rate of elongation of the blank due to the pressure and at the time the same is taking place, the length of the mandrel body being equal, at least, to the elongation of the apertured article due to the pressure.

3. The method of piercing a solid mass of metal in order to form a longitudinally apertured article which consists in feeding the blank in one direction towards and against a mandrel sufficient to cause a piercing action to take place, and then subjecting it to a rolling action operating longitudinally upon the blank, the point of application of the rolling pressure progressively traveling relative to the mandrel in the direction of feed of the blank and at a rate of speed relative to the mandrel equal to the rate of elongation of the blank due to the rolling action and at the time the same is taking place.

4. The method of piercing a solid mass of metal in order to form a longitudinally apertured article which consists in feeding the blank in one direction towards and against a mandrel sufficient to cause a piercing action to take place, said mandrel having a piercing head and a body portion adjacent thereto and then subjecting it to a rolling action operating longitudinally upon the blank and adjacent to the body portion of the mandrel, the point of application of the rolling pressure progressively traveling relative to the mandrel in the direction of feed of the blank and at a rate of speed relative to the mandrel equal to the rate of elongation of the blank due to the rolling action and at the time the same is taking place, the length of the mandrel body being equal at least to the elongation of the tube due to the rolling action.

5. Means for piercing a mass of metal for forming a tube or the like comprising rotatable housings, rolls mounted in said housings at one side of the axis thereof, a piercing mandrel disposed in front of said rolls, and means disposed behind said rolls for the purpose of forcing the metal onto the mandrel; as set forth.

6. Means for piercing a metal bloom for forming a tube or the like comprising rotatable housings, rolls mounted in said housings arranged to operate on the bloom longitudinally, a mandrel disposed in front of said rolls, a bloom guide situated behind said rolls, and a feed device having a pusher head of diameter less than the guide for feeding the whole of the bloom onto said mandrel.

In testimony whereof, I affix my signature in presence of two witnesses.

HENRY REINHARD.

Witnesses:
BERTRAM H. MATTHEWS,
CHARLES W. CHELL.